Patented July 3, 1934

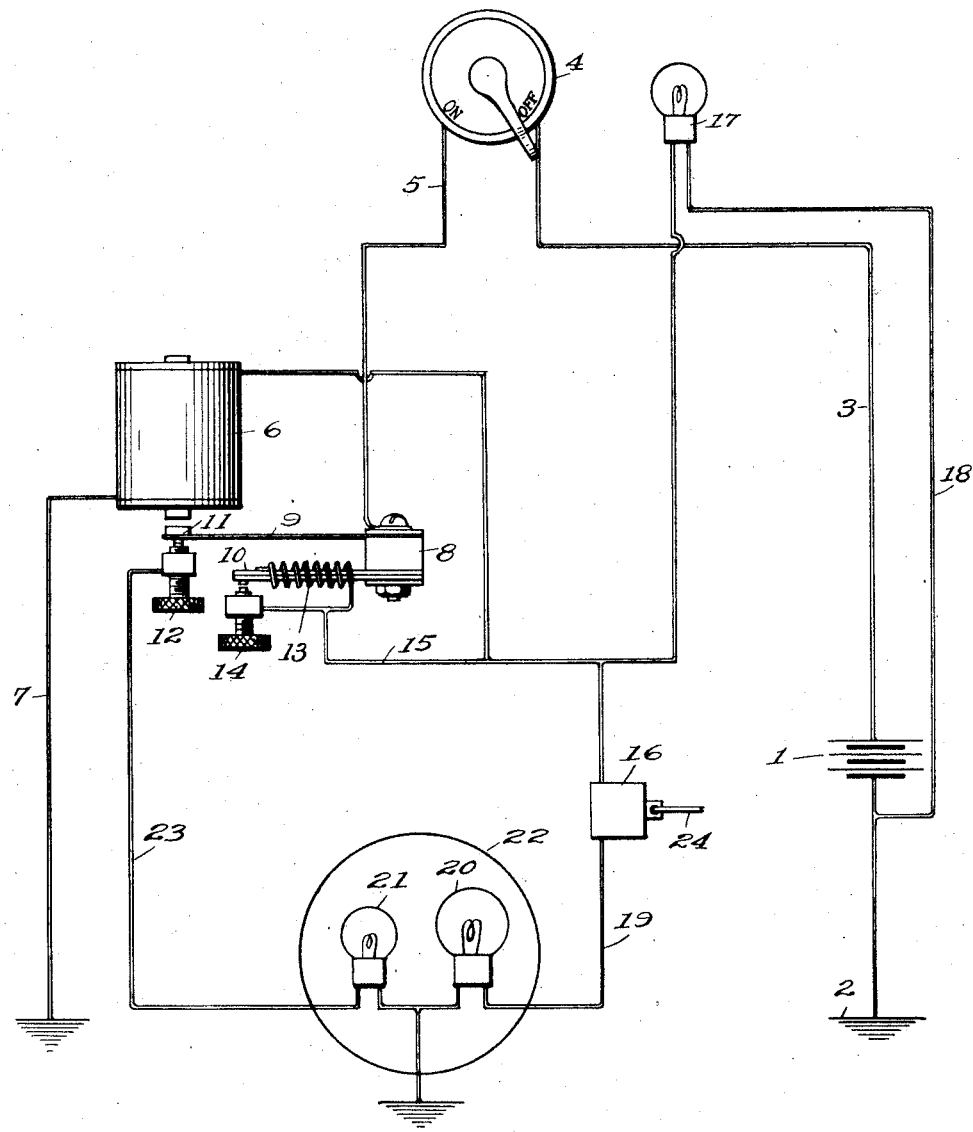

1,965,176

UNITED STATES PATENT OFFICE 1,965,176

SIGNAL

Hobart B. Eveland, Peoria, Ill.

Application November 17, 1930, Serial No. 496,090

3 Claims. (Cl. 177—329)

My invention relates more particularly to devices for use on motor vehicles to signal to following vehicles that the operator of the preceeding vehicle is applying his brakes either for stopping or for other traffic conditions, though it is not limited to this use or service and may be used for a variety of other purposes as will be readily apparent to those skilled in the art to which my invention appertains.

One object of my invention is to provide a device which, when operated will display a plurality of signals successively in a pre-determined order and at pre-determined time intervals.

Other objects of my invention will appear and be described in the specification.

The novelty of my invention will be hereinafter more fully set forth and specifically pointed out in the claims.

In the accompanying drawing I have shown the various parts of a device embodying my invention together with the connections and circuits necessary for its operation.

Heretofore the general practice has been to provide a "stop" light, usually mounted on the rear of a motor vehicle, frequently in the same case or housing with the "tail" light, and to provide this "stop" light with a switch operated by the foot brake pedal or in common with the foot brake pedal and the emergency brake lever or the gear shift lever when in reversed position.

In my device I prefer to employ two lights which, when the brake pedal switch is closed, flash alternately either through the same or different colored lenses to the end that the attention of the operator of a following vehicle will be more prominently called to the operation of the signal and I accomplish this object by the mechanism and connections to be now described.

In the drawing 1 represents the usual 6 volt battery which is grounded to the frame as at 2 and which is connected by the lead 3 with the ignition switch 4. Up to this point the construction is the ordinary construction of motor vehicles.

From the contact of the ignition switch when the latter is in the "on" position, I extend a lead 5 which leads to a support 8, the latter carrying a spring 9 and a bimetallic thermostat element 10.

The spring 9 carries an armature 11 and a contact which cooperates with a contact screw 12. The thermostat element 10 is electrically connected to one end of a heating coil 13, the latter having a resistance of substantially 3 ohms the other end of which is connected to a contact screw 14, this connection branching as by lead 15 which, in turn branches and extends to one terminal of an electro magnetic coil 6, the latter having a resistance of substantially 20 ohms, and from the other terminal of which a lead 7 extends to the ground, this lead 15 also extending to the brake pedal switch 16, and a pilot light 17 preferably mounted on the dash of the vehicle. A lead 18 extends from the lamp 17 and is connected to the ground.

The brake pedal switch 16 is connected by a lead 19 to a lamp 20, of substantially 21 candlepower the other side of the lamp being commoned to the ground and to a lamp 21, the latter being of substantially 6 candlepower. The lamps 20 and 21 are both mounted in any suitable housing indicated at 22 which may also contain the ordinary tail light if desired. A lead 23 extends from the contact screw 12 to lamp 21.

By way of example the relative resistances of various pieces of apparatus are as follows: lamp 17 substantially 12 ohms; lamp 20 substantially 1.714 ohms; lamp 21 substantially 6 ohms; while the resistance of the coil 6 is substantially 25 ohms and that of coil 13 substantially 3 ohms.

The operation of the device is as follows:

With the ignition switch in the off position as shown, the circuit is open through the coil 6 and all of the other parts illustrated but upon closing the ignition switch, current flows through lead 5, thermostat element 10, coil 13, lead 15, and thence through the coil 6 to the ground thereby energizing coil 6 to draw the armature 11 and its contact out of contact with the screw 12 and at the same time permitting current to flow through the thermostat 10, coil 13, lead 15, lamp 17 and so to the ground through the lead 18, lighting the lamp 17 through the resistance of the heating coil 13. The lamp 17 is preferably of low candlepower such as three candlepower which is ordinarily used in dash lamps and so the current flow through the coil 13 is comparatively light, being sufficient to warm this coil but not sufficient to cause operation of the thermostat 10. It is to be noted that coil 6 is wound of sufficiently fine wire and in sufficient quantity to produce a coil having power enough to lift armature 11 and high enough resistance to permit only a very small flow of current. The contacts 10-14 are normally open as shown.

Under the conditions just described the lights 20 and 21 of course remain dark, the switch 16 being open.

When the switch 16 is closed by an application of the brakes, the brake pedal being connected to the switch 16 by any suitable connection 24, current then flows to the lamp 20 which is of higher candlepower than the lamp 17 (for example twenty-one candlepower) and of lower resistance and this additional load begins to heat the thermostat 10 to move it into connection with the screw 14 while at the same time the magnetic pull of coil 6 is decreased because of the decrease in current through the coil 6, due to the decrease of voltage across said coil caused by the increased drop in the resistance coil 13 with the greater load. Thus spring 9 moves the armature and its contact away from the coil and into contact with the screw 12 to light the lamp 21. As soon as the coil 13 has heated the thermostat 10 and established connection between it and the screw 14, the coil 13 is shunted out of the circuit. With the coil 13 shunted out of the circuit, the voltage drop through said coil is likewise shunted out, and substantially the full battery voltage is applied to coil 6, thereby increasing the current in said coil and increasing the magnetism thereof sufficiently to raise the armature 11, and open the circuit through the lamp 21, the lamp 20 meanwhile being fully illuminated when the thermostat 10 is in contact with the screw 14.

During the period of the contact between the thermostat 10 and the screw 14, the coil 13 cools and the thermostat moves out of contact with the screw 14, again throwing the coil 13 into the circuit and thereby reducing the flow of current to the lamp 20 which practically extinguishes it and, upon the coil 13 again coming into the circuit the magnetic pull of the coil 6 is reduced and its armature moves into contact with the screw 12 lighting lamp 21.

This cycle continues as long as switch 16 is closed and, by proper setting of the screws 12 and 14, but more particularly 14, the period of illumination of the lights 20 and 21 may be adjusted so that they will alternately burn for one second or any other desirable period of time.

As soon as switch 16 is opened, the coil 6 remains energized and the lamp 17 burns dimly as a tell-tale for the circuit. During the period when the switch 16 is closed, the lamp 17 is alternately illuminated and dim with the lamps 20 in the housing 22 thereby informing the operator that the device is functioning properly.

It is obvious that the grounds from the lead 7, the ground between the two lamps 20 and 21, and the ground 2 may be all connected together to form a complete wired circuit in those installations where a frame or other convenient grounding construction does not exist.

The tension of the carrier 9 for the armature 11 should be such that under conditions when the switch 16 is open there will be sufficient magnetism produced by the coil 6 to open the circuit of the contact screw 12.

From the foregoing it will be seen when the ignition switch 4 is closed the current flow is from battery 1 through lead 3, switch 4, lead 5, coil 13, lead 15 to coil 6 which latter is energized to attract armature 11, a branch connection from 15 illuminating lamp 17. When the brake operated switch 16 is closed the resistance of coil 13 causes the latter to heat up sufficiently to bring the bi-metallic arm 10 into contact with screw 14, illuminating lamp 20 fully and increasing the flow of current through coil 6. This latter action causes the coil 6 to attract armature 11 whereupon same moves out of contact with screw 12 causing lamp 21 to be extinguished. Upon cooling of coil 13 the action is reversed causing lamp 20 to be dimmed and 21 to be illuminated whereby the lamps 20 and 21, flash intermittently. Upon opening of switch 16 with the ignition switch closed current again flows from battery 1 to coil 6 for drawing the armature 11 away from contact screw 12 thus completely extinguishing lamps 20 and 21.

It is noted that while I have shown and described lamps 20 and 21, signals may be given by other means such as bells or horns, and further that the signaling means operate alternately without any appreciable time interval between the operation of one and the operation of the other to the end that there will be no periods while the switch 16 is closed when the signaling element 20 and the signaling element 21 will both be inoperative.

The device illustrated and above described might be termed a closed circuit device, and it is obvious that it could be placed on an open circuit basis by simply connecting the lead 5 to the lead 3 and placing the switch 16 in the lead 5 instead of between leads 15 and 19, which then would be directly connected together, under which conditions there would be no current flow through the coil 6 and lamp 17 and the other parts of the device except when the switch 16 would be closed.

Having thus fully described my invention, I claim:

1. In a flashing signal system, a circuit including a source, a manually operated switch, the heating element of a thermostatic switch, a second manually operable switch and a low resistance signal lamp connected in series in the order named, an electro-magnetic switch provided with an actuating coil and switch contacts normally closed when the coil is deenergized, means connecting said coil to the circuit in parallel with said second mentioned manual switch and the low resistance signal lamp, a high resistance signal lamp, means connecting said high resistance signal lamp in series with the contacts of said electromagnetic switch and in parallel with the source and said first mentioned manual switch, said thermostatic switch being provided with means for shunting the heating element thereof out of said circuit after a predetermined heating, the relative resistances of said signal lamps, said coil and said heating element being such that when said first mentioned manual switch only is closed said coil will be energized to open its contacts and the signal lamps dark but when both manual switches are closed the thermostatic switch will intermittently operate and said coil will be deenergized and the low resistance signal lamp only partly illuminated when the heating element is in the circuit and the coil will be energized and the low resistance signal lamp fully illuminated when the heating element is shunted out of the circuit by the heating thereof whereby said signal lamps will be alternately flashed as said thermostatic switch intermittently operates.

2. The combination with a system as set forth in claim 1 of a high resistance pilot lamp connected to the circuit in parallel with the coil of said electromagnetic switch whereby when the first mentioned manual switch only is closed the pilot lamp will be partly illuminated to indicate that said switch is closed and when both manual switches are closed the illumination of the pilot light will be decreased when the said heating element is in series with the circuit and will be increased to full illumination when said heating element is shunted out of the circuit thus causing a flashing of the pilot in unison with the low resistance signal lamp to indicate that a signal is being given.

3. In a flashing signal system, a circuit including a source, a manually operated switch, the heating element of a thermostatic switch, a low resistance signal lamp connected in series in the order named, an electro-magnetic switch provided with an actuating coil and switch contacts normally closed when the coil is deenergized, means connecting said coil to the circuit in parallel with the low resistance signal lamp, a high resistance signal lamp, means connecting said high resistance signal lamp in series with the contacts of said electromagnetic switch and in parallel with the source and said manual switch, said thermostatic switch being provided with means for shunting the heating element thereof out of said circuit after a predetermined heating, the relative resistances of said signal lamps, said coil and said heating element being such that when said manual switch is closed said coil will be energized to open its contacts and the signal lamps dark so that when the manual switch is closed the thermostatic switch will intermittently operate and said coil will be deenergized and the low resistance signal lamp only partly illuminated when the heating element is in the circuit and the coil will be energized and the low resistance signal lamp fully illuminated when the heating element is shunted out of the circuit by the heating thereof whereby said signal lamps will be alternately flashed as said thermostatic switch intermittently operates.

HOBART B. EVELAND.